United States Patent
Martin

(10) Patent No.: US 7,988,203 B2
(45) Date of Patent: Aug. 2, 2011

(54) MINIMAL PENETRATION LATERAL PIPE CONNECTION ASSEMBLY

(75) Inventor: Frank P. Martin, Hillsboro, OR (US)

(73) Assignee: Sewer Tap Inc., Cornelius, OR (US)

( * ) Notice: Subject to any disclaimer, the term of this patent is extended or adjusted under 35 U.S.C. 154(b) by 776 days.

(21) Appl. No.: 11/850,530

(22) Filed: Sep. 5, 2007

(65) Prior Publication Data

US 2009/0058081 A1 Mar. 5, 2009

(51) Int. Cl.
*F16L 21/00* (2006.01)

(52) U.S. Cl. ............. 285/236; 285/109; 285/139.1; 285/201; 285/205

(58) Field of Classification Search ............ 285/109, 285/137.11, 139.1–139.3, 140.1, 141.1, 189, 285/201–208, 211, 222, 235–237
See application file for complete search history.

(56) References Cited

U.S. PATENT DOCUMENTS

| | | | |
|---|---|---|---|
| 1,291,578 A | 1/1919 | McPhail | |
| 2,039,009 A | 4/1936 | Lampman | |
| 2,316,724 A | 4/1943 | Sperry | |
| 2,543,909 A | 3/1951 | Hatheway | |
| 3,246,132 A | 4/1966 | Jordan | |
| 3,424,481 A | 1/1969 | Fulghum | |
| 3,663,042 A | 5/1972 | Fowler | |
| 3,922,107 A | 11/1975 | Fowler | |
| 4,232,421 A * | 11/1980 | Tucker | 16/2.2 |
| 4,365,829 A | 12/1982 | Fowler | |
| 4,706,999 A | 11/1987 | Hynes | |
| 4,738,310 A * | 4/1988 | Luttenberger et al. | 165/158 |
| 4,759,459 A | 7/1988 | Bailey | |
| 5,111,858 A | 5/1992 | Aittama | |
| 5,129,684 A | 7/1992 | Lawrence | |
| 5,145,216 A | 9/1992 | Valls, Jr. | |
| 5,150,928 A | 9/1992 | Lodder | |
| 5,211,428 A | 5/1993 | Emerson | |
| 5,466,016 A | 11/1995 | Briody | |
| 5,826,919 A | 10/1998 | Bravo | |
| 6,051,795 A | 4/2000 | Fisher | |
| 6,113,156 A | 9/2000 | Bea | |
| 6,224,115 B1 | 5/2001 | Blasch et al. | |

(Continued)

OTHER PUBLICATIONS

Inserta Fittings Co., Lateral Connections Solutions Inserta Tee, Brochure, 24 pages, Jan. 1, 2003.

(Continued)

*Primary Examiner* — Aaron Dunwoody
*Assistant Examiner* — Fannie Kee
(74) *Attorney, Agent, or Firm* — Finnegan, Henderson, Farabow, Garrett & Dunner, LLP

(57) ABSTRACT

A pipe connection assembly is disclosed including a cylindrical hub having an interior diameter and a leading end having an exterior beveled surface that defines a leading edge of the hub; and a cylindrical elastomeric sleeve having an inner end that includes a radially inwardly projecting lip having a seat surface inclined to correspond to the beveled surface of the hub so the seat surface engages the beveled surface of the hub. The lip includes an annular stop projecting inwardly and having an interior diameter that is less than the interior diameter of the hub, thereby to define a stop surface that contacts the leading edge of the hub when the hub is inserted into the sleeve. The assembly restricts to a minimal amount the penetration of a hub component of the assembly into the cored hole of the mainline pipe to which the assembly is connected.

8 Claims, 3 Drawing Sheets

U.S. PATENT DOCUMENTS

| | | |
|---|---|---|
| 6,357,617 B1 | 3/2002 | Kido |
| 6,508,490 B1 | 1/2003 | Hoffman |
| 6,761,380 B2 | 7/2004 | Pachiarz |
| 7,055,867 B2 | 6/2006 | Faller |
| 2007/0181342 A1 | 8/2007 | Duncan |
| 2008/0303270 A1 | 12/2008 | Kief |

OTHER PUBLICATIONS

Office Action, Canadian Patent Office; Corresponding application No. 2,611,315, 2 pages, Aug. 31, 2009.

* cited by examiner

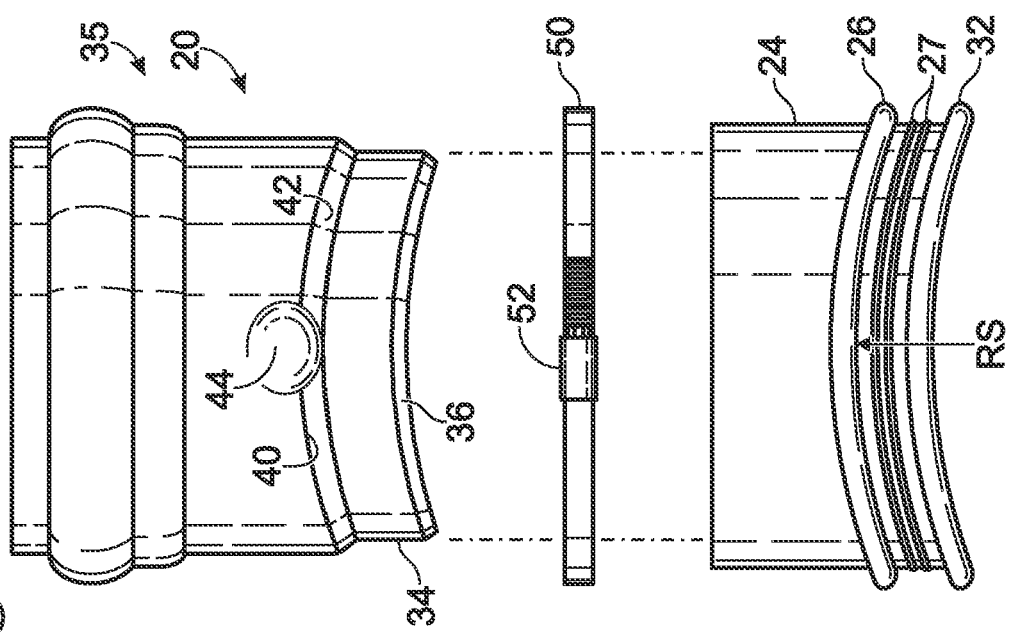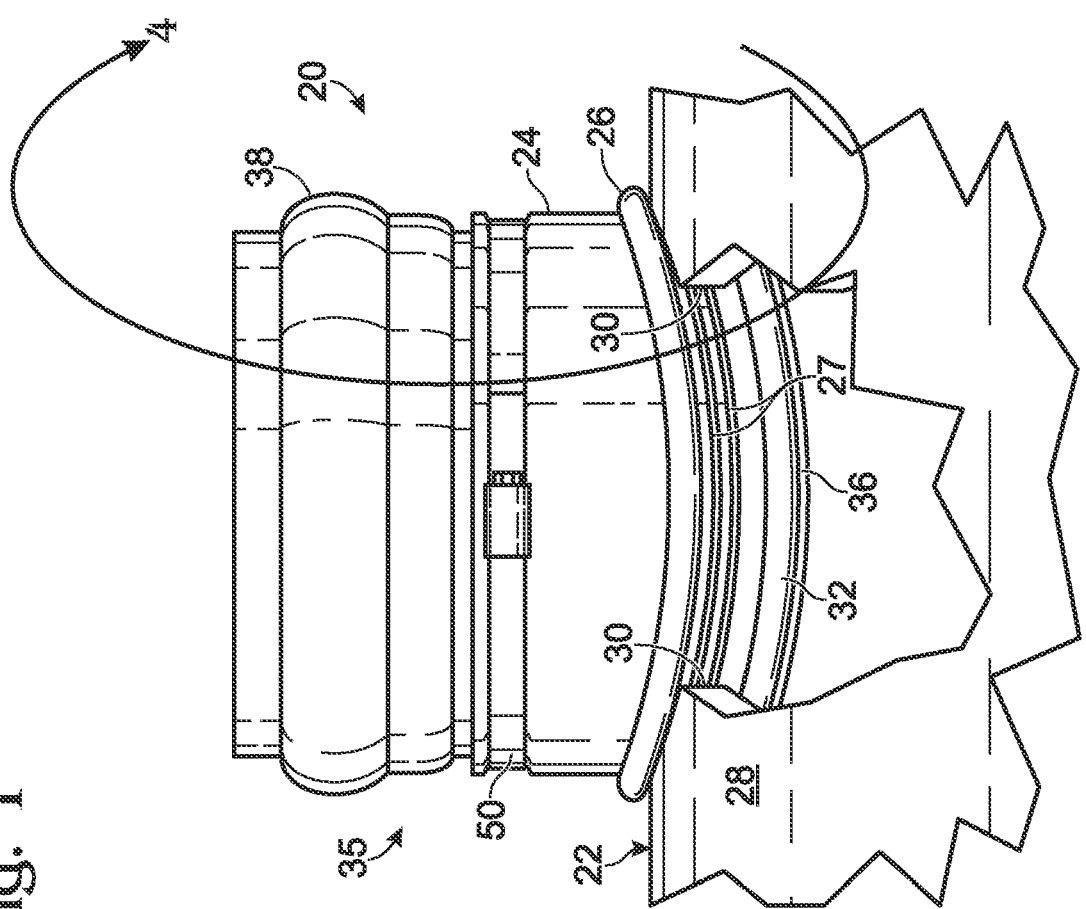

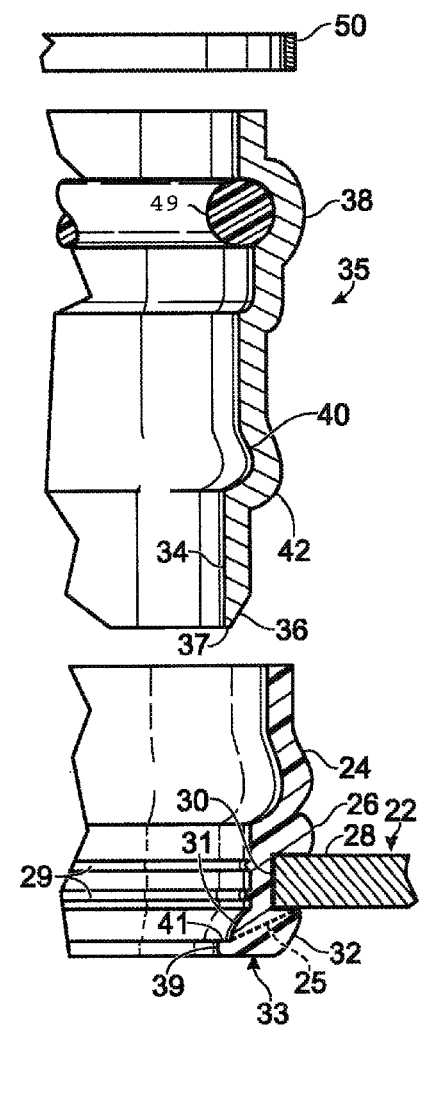
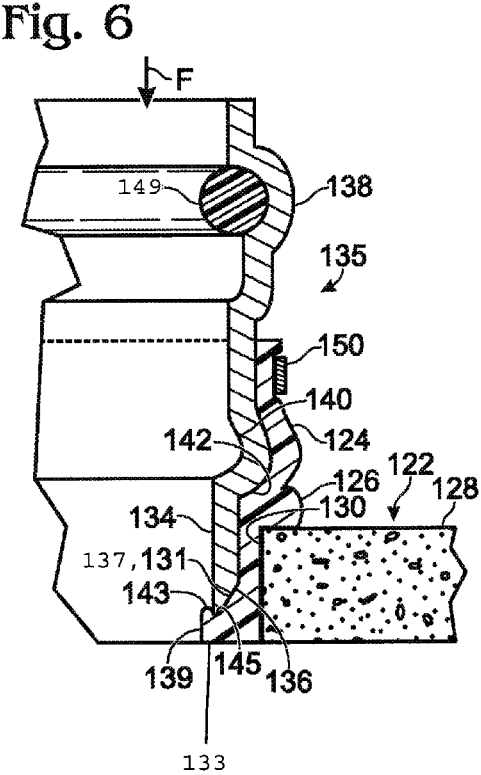

MINIMAL PENETRATION LATERAL PIPE CONNECTION ASSEMBLY

FIELD OF THE INVENTION

This invention pertains to what is known as a service connection between a main wastewater or storm water pipe and a lateral connecting pipe.

BACKGROUND AND SUMMARY OF THE INVENTION

Gravity-type pipe conveyance systems for waste or storm water generally include a mainline pipe or conduit to which service lateral pipes are connected. Many applications call for the connection of the lateral pipes to be made such that the lateral is perpendicular to the mainline pipe. Such connections are often referred to as "Tee" connections or service connections. Alternatively, the service lateral pipe can be connected at an angle (although with the long axis intersecting the long axis of the mainline pipe) and is thus designated, for example, as a "Wye" or 45-Degree service connection.

Service connections require a hole to be cored through the sidewall of the mainline pipe. The diameter of the cored hole is made slightly larger than the diameter of the service lateral pipe, which has a smaller diameter than the mainline pipe.

One effective service connection system is available from Inserta Fittings Inc., the assignee of the present application (www.insertatee.com), and marketed under the trademark INSERTA FITTINGS. That system comprises a three-piece service connection that is compression fit, without special tooling, into the hole that is cored through the wall of a wastewater or storm water mainline pipe. The three-piece service connection comprises a substantially rigid, cylindrical, hollow hub; an elastomeric sleeve; and a stainless steel band. The sleeve fits into a cored hole in the mainline pipe. A leading end of the hub is forcibly inserted into the elastomeric sleeve. After the hub is inserted, a stainless steel band is fastened around the sleeve to secure together the sleeve and the hub. The exposed or trailing end of the hub can be shaped to define a conventional bell component of a bell and spigot joint, and receives the spigot end of the service lateral that is to be connected. This type of service connection may be used with any of a wide variety of pipe types (concrete, PVC, corrugated, etc).

It is important to control the depth of penetration of the hub into the mainline pipe when the service connection is made. Many municipalities specify that a high percentage of the mainline pipe must remain clear after installation of the lateral pipe so that normal flow through the pipe is not impeded, and so that there is provided sufficient clearance to permit passage of remote inspection devices through the mainline pipe past the service connections. One required way of inspecting for this is to have the installer pull a mandrel through the pipe and past the connection. The mandrel is specified to have an outside diameter that is 95% of the inside diameter of the mainline pipe.

If the hub were inserted too far into the mainline pipe, the amount of clearance in the mainline pipe could be reduced to an unsatisfactory level (thus impeding the movement of the inspection mandrel just noted). In this regard, it is possible for an installer to apply excessive axial force on the hub when inserting the hub into the sleeve. Alternatively, too much axial force may be applied to the service lateral pipe when fitting the spigot end of that pipe into the connection hub. In such an instance, the excessive force may cause the hub to move too far through the sleeve, and create an undesirable amount of penetration of the leading end of the hub into the mainline pipe, which, as noted, can result in interference with the operation and/or inspection of the mainline pipe.

The hub is forcibly inserted into the sleeve because the fit between the sleeve and hub is snug, and because of the high friction coefficient between the elastomeric sleeve and the hub. Currently, the leading ends of hubs are shaped to have external bevels that facilitate the insertion of the hub through the snug-fitting elastomeric sleeve.

In the past, hubs have been provided with visible markings on the exterior to serve as a hub insertion limit indicator. That is, a mark, such as a thick, red line, was placed on the hub and is normally visible to the installer. If the installer of the lateral pipe drove the hub into the sleeve by the correct amount, the marking line would remain at least partly visible, aligned with the outer edge of the sleeve into which the hub is inserted.

If, however, an installer drove the hub too far into the sleeve that is mounted to the mainline pipe (hence driving the hub too far into the mainline pipe) the line would not be visible, thus indicating the defective installation of the lateral pipe. In some construction environments, however, rainwater, mud, wear, and other elements may interfere with the installer's view of (hence use of) the limit marking on the hub, thus reducing or eliminating the usefulness of the mark.

In addition to minimizing the amount of penetration of the sleeved hub into the mainline pipe, it is also desirable to ensure that the service connection is adequately sealed. The sealing aspect of such connections is subject to increasingly rigorous testing, including air and/or water pressure and seismic testing, as part of an inspection approval process.

The present invention is directed to an improved lateral pipe connection assembly that minimizes the amount the penetration of the hub into the cored hole of the mainline pipe and that provides enhanced sealing of the connection.

BRIEF DESCRIPTION OF THE DRAWINGS

FIG. 1 is side view of one preferred embodiment of a service lateral pipe connection assembly constructed in accord with the present invention.

FIG. 2 is an exploded view of the service lateral pipe connection assembly.

FIG. 4 is a partly exploded, cross sectional view of the service lateral pipe connection assembly, taken along line 4-4 of FIG. 1.

FIG. 6 is a cross sectional view of an alternative embodiment of a service lateral pipe connection assembly constructed in accord with the present invention.

DETAILED DESCRIPTION OF A PREFERRED EMBODIMENT

Figure 5:
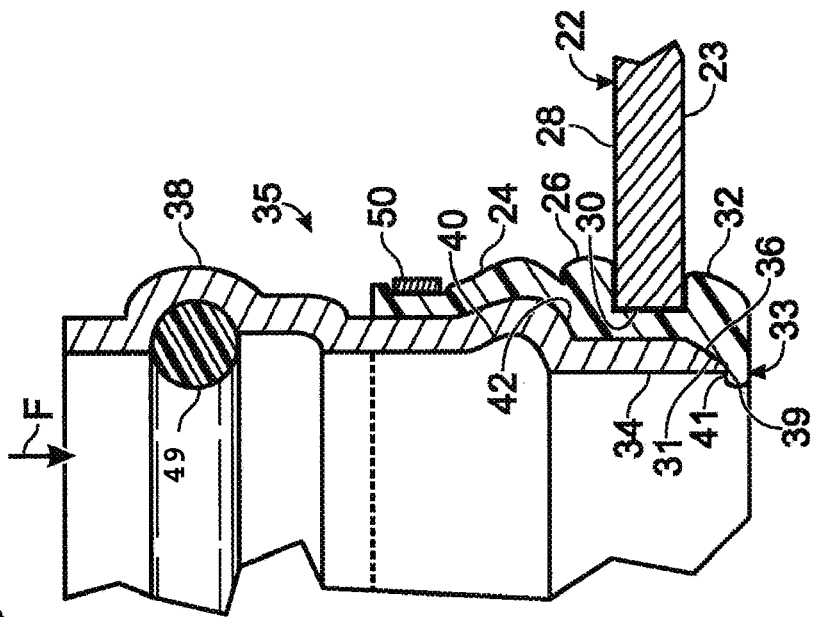
FIG. 5 is an assembled, cross sectional view of the service lateral pipe connection assembly, taken along line 4-4 of FIG. 1.

The service lateral pipe connection assembly 20 (hereafter referred to as "service connection") is shown in FIG. 1 completely connected to the mainline pipe 22, which is shown partly cut away. FIG. 1 shows the service connection 20 made to a solid-walled mainline pipe such as a PVC sewer pipe. It will be understood, however, that any of a variety of pipe configurations (ribbed, corrugated, thick-walled concrete, clay, etc) may be used as a mainline pipe. Moreover, the structure into which the service connection is made is not limited to pipes. The service connection may be similarly made to any structure requiring a lateral pipe connection, such as manholes, catch basins, vaults, and electrical boxes for example, such structures being made from any of a variety of materials (concrete, fiberglass, etc).

With reference to FIGS. 1-5, the service connection 20 includes a generally cylindrical elastomeric sleeve 24, which is preferably made of rubber. The end of the sleeve that fits into the mainline pipe 22 is shaped to match the curvature of that pipe. In this embodiment, the sleeve includes a radially outwardly protruding outer rib 26 that is integrally formed with the sleeve and abuts the outer surface 28 of the mainline pipe 22 (FIG. 1). Specifically, the outer rib 26 is located on the outer surface of the cylindrical sleeve 24 and arranged so that when the sleeve is inserted into the hole 30 that is cored through the mainline pipe 22, the outer rib will rest against the outer surface 28, at the edge of the hole 30. As such, the outer rib 26 is shaped to define a sinusoidal path around the sleeve. The repeating curvature "RS" of the sinusoidal outer rib 26 (FIG. 2) conforms to the radius of the mainline pipe to which the service connection is made (here the radius being measured to the outside diameter of the mainline pipe 22).

In this embodiment, where the connection is made to a relatively thin-walled pipe 22, the outermost end of the sleeve 24 is also provided with a resilient, radially outwardly protruding inner rib 32. The end of the sleeve carrying that rib is compressed or folded and moved through the cored hole 30 as the sleeve is located in the hole. Once inside, the inner end of the sleeve resiles or unfolds and bears against the wall defined by the hole 30 through the pipe. The inner rib 32 abuts the interior surface 23 of the pipe 22 (FIG. 5). This abutting position of the rib 32 and interior surface 23 serves to resist inadvertent removal of the sleeve from the hole and, as described more below, to facilitate seating of the leading end 34 of the hub 35 against a radially inwardly projecting lip 33 formed in the sleeve. The inner rib 32, like the outer rib 26, extends around the sleeve in a sinusoidal path.

Once the sleeve 24 is fit within the cored hole 30 of the pipe 22, the leading end 34 of the rigid, cylindrical hub 35 is inserted into the sleeve. Preferably, the hub 35 is made of lightweight, sturdy, incompressible material, such as PVC, although any of a wide variety of materials may be used.

The outside diameter of the leading end 34 of the hub 35 is slightly larger than the inside diameter of the sleeve 24 so that the sleeve stretches slightly to snugly fit over the hub. The exterior of the hub 34 has a beveled surface 36 (FIG. 4) on its leading end, thereby defining a relatively sharp leading edge 37 of the hub that facilitates insertion of the hub through into the snug-fitting, elastomeric sleeve 24.

With particular reference to FIGS. 4 and 5, the sleeve 24 has integrally formed with, or attached thereto, a radially inwardly projecting lip 33 that is shaped to include an inclined seat surface 31. That seat surface is inclined at an angle corresponding to the angle made by the beveled surface 36 in the hub so that when the inner end of the hub 35 is fully inserted into the sleeve (FIG. 5), the generally parallel beveled surface 36 and seat surface 31 will engage to firmly seat the hub leading end 34 in the sleeve.

In one embodiment, at least a portion of the seat surface 31 normally (that is, when the hub is not inserted into the sleeve in contact with the lip 33, see FIG. 4) extends from the sleeve to be compressed against the beveled surface 36 of the hub when the hub is fully inserted into the sleeve. This compression enhances the fluid seal between the hub 35 and sleeve 24.

It will be appreciated that the engagement between the seat surface 31 of the sleeve and the beveled surface 36 of the leading end 34 of the hub will resist or limit the further penetration of the hub through the sleeve (hence, the penetration of the hub into the mainline pipe 22). Also, the resistance to further penetration of the hub will be felt by the installer. This tactile response or "feel" of the engaging seat surface 31 and beveled surface 36 can supplement or replace the visual indicia (e.g. red line) mentioned earlier and which indicia may be difficult to locate or to maintain as a visible mark when the environment in which the service connection is made is less than optimal, as when, for example, the connection assembly is partly obscured by mud, water or dust.

It is noteworthy here that, as shown in FIG. 4, when the sleeve 24 is fit into the hole 30 in the pipe 22, (and before the hub 35 is inserted through the sleeve) the inner rib 32 abuts the interior surface 23 of the pipe 22. This abutting position of the rib 32 and interior surface 23 serves to, among other things, facilitate seating of the beveled surface 36 of the leading end of the hub 35 against the inclined seat surface 31 of the lip 33 in the sleeve. Specifically, with continued reference to FIG. 4 and to FIG. 5, it can be seen that the lip 33 projects inwardly into the path of the hub that is later inserted into the sleeve. The rib 32 and inwardly projecting lip 33 formed in the sleeve form a continuous piece of elastomeric material (the location of which is generally represented by the dashed line 25 in FIG. 4) extending between the seat surface 31 of the lip and the location where the rib 32 abuts the interior surface 23 of the pipe 22. As a result, the lip 33 is secured in position in the path of the leading edge of the hub to prevent rotation of the lip 33 out of the path of the advancing hub. Rather, the advancing beveled surface 36 of the hub will tend to compress against and engage the seat surface 31 of the lip 33.

In one preferred embodiment, the lip 33 on the sleeve is also shaped to include a stop 39 that is formed in the lip 33 to extend inwardly and obstruct excessive penetration of the leading edge 37 of the hub through the sleeve. That is, the stop 39 includes a stop surface 41 that is separate from and oblique to the seat surface 31 of the lip. The radially innermost part of the stop 39 defines a diameter that is smaller than the internal diameter of the hub. Consequently, the stop surface 41 extends in the path of, and obstructs penetration of, the leading edge 37 of the hub. Moreover, the stop surface 41 and seat surface 31 of the lip are arranged relative to each other such that penetration of the leading edge of the hub into the sleeve is limited to the amount required to seat the beveled edge 36 against the seat surface 31 of the lip 33, as shown in FIG. 5. As shown there, the sleeve and inserted hub penetrate only slightly beyond the interior surface 23 of the pipe 22 to which it is connected.

When the hub leading end 34 is fully inserted into the sleeve 24, the sleeve is compressed by the wall of the hub (FIG. 5) against the edge of the hole 30 in the pipe 22, thereby sealing the connection between the sleeved hub and pipe. In one preferred embodiment, the exterior surface of the sleeve that is compressed against the pipe is provided with one or more (two shown in FIGS. 1, and 2) annular protrusions 27 that extend around the sleeve in the above-described sinusoidal pattern to be compressed against the sleeve and pipe when the hub is inserted into the sleeve. The elastomeric protrusions 27 may be formed with or added to the sleeve and can be shaped to define semi "O" rings. Similar such protrusions may be provided (as shown in the uncompressed state at 29 in FIG. 4) on the inside surface of the sleeve, away from the seat surface 31 of the lip 33 of the sleeve.

As noted earlier, the exposed end 38 of the hub 35 (FIG. 5) is shaped to define a conventional bell component of a bell and spigot joint. That end 38 carries a conventional internal gasket 49, and receives the spigot end of the service lateral pipe (not shown) that is to be connected to the mainline. The bell-component end of the hub is shown by way of example only. It will be appreciated that the exposed end of the hub can be configured for other connections.

Figure 3:
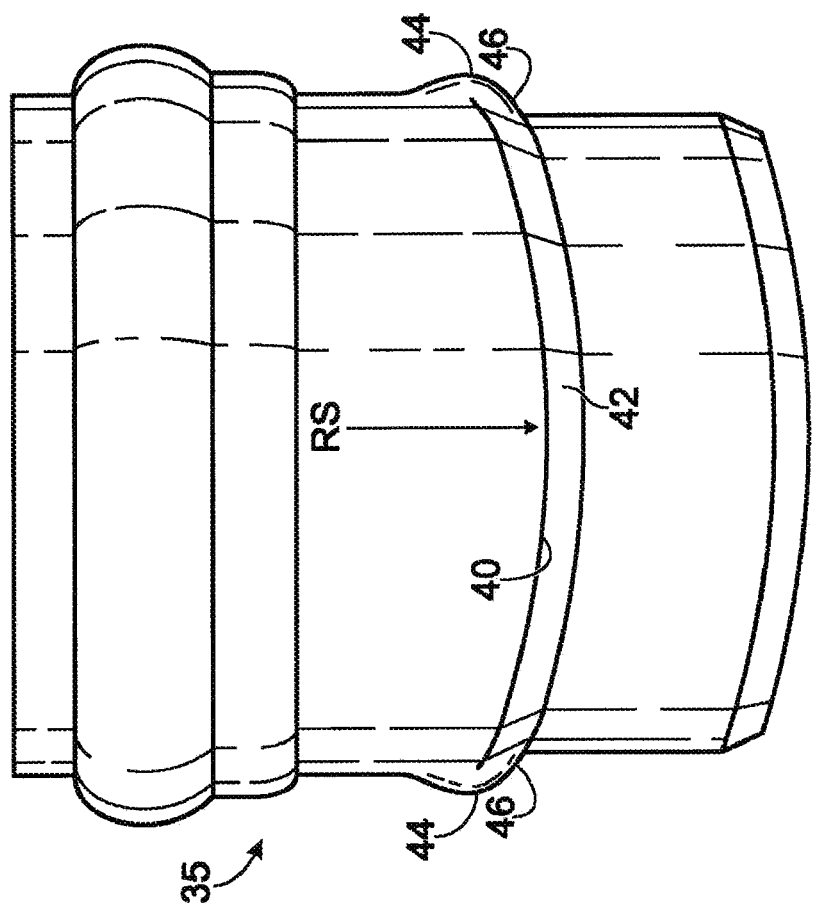
FIG. 3 is front view of the hub component of the service lateral pipe connection assembly.

With particular reference to FIGS. 2 and 3, the hub 35 made in accordance with the present invention includes a shoulder 40 that projects outwardly from the outer surface of the hub 35 between the leading end 34 and remainder of the hub. Along its length, the shoulder 40 is shaped to conform to the sinusoidal shape of the outer rib 26 on the sleeve, described above. The leading edge 42 of the shoulder is sloped or beveled.

When the hub 35 if fully inserted in the sleeve 24, the shoulder leading edge 42 bears against the interior of the sleeve 24 in a manner such that an axial, installation force applied to the hub, as depicted by arrow F in FIG. 5, will have the effect of seating the hub shoulder 40 against the outer rib 26 around the entire edge of the hole 30, as well as seating the beveled surface 36 of the hub against the seat surface 31 of the sleeve lip 33 as discussed above.

The seating provided by the interaction of the shoulder 42 and outer rib 26 effects proper alignment of the hub 35 (hence, the lateral pipe) in the hole 30, and also helps prevent undesired excessive penetration of the hub into the cored hole 30 of the pipe, which might occur, as noted above, in instances where the hole 30 is not properly formed and/or excessive axial force is applied to the connected lateral service pipe.

A pair of optional, diametrically opposed bosses 44 (FIGS. 2 and 3) are also formed in the hub. Each boss 44 comprises a generally rounded projection of the outer wall of the hub, extending outwardly slightly more than the outward extent of the shoulder 40. The leading face or edge 46 of each boss 44 is generally contiguous with the leading edge 42 of the shoulder 40 but is shaped to be relatively steeper (that is, closer to orthogonal with the outer surface of the hub) than the sloped leading edge 42 of the shoulder 40. Thus, the bosses 44 serve to provide sure stops or limits against excessive penetration of the hub into the pipe 22, and supplement the seating and aligning effect of the sinusoidal shaped shoulder 40 discussed above.

Moreover, the relatively greater extent of projection of the bosses 44 from the outer surface of the hub 35 causes a relatively tight engagement with the elastomeric sleeve 24, thereby restricting the inadvertent removal of the sleeve 24 from the hub 35 should the hub or connected lateral pipe be pulled slightly (away from the mainline pipe 22) during the connection process.

When the sleeved hub 35 is properly fit into the hole 30 in the mainline pipe, a simple stainless steel band 50 is tightened (using a fastener as shown at 52) around the outer end of the sleeve to secure the sleeve and hub.

FIG. 6 depicts an alternative embodiment of the sleeve 124 of the present invention that is useful when the service connection is made to a relatively thick-walled pipe 122, such as the exemplary concrete one shown in FIG. 6 (although other pipe materials, such as clay, may be employed). In such a connection, the sleeve 124 is not provided with a radially outwardly protruding inner rib as appears at 32 in the embodiment shown in FIG. 5. Rather, such a rib is omitted and the sleeve is sized so that the inwardly projecting lip 133 (otherwise shaped like the lip 33 of the prior described embodiment) is spaced from the radially outwardly protruding outer rib 126 (generally matching the rib 26 described above) so that the lip is substantially located within the hole 130 formed through the thick-walled pipe 122. As a result, insertion of the hub 135 into the sleeve 124 causes the beveled surface 136 of the hub to engage the seat surface 131 of the lip and compress the lip against the wall of the hole 130 formed in the pipe. It will be appreciated that in this embodiment, penetration of the fully seated hub 135 into the interior of the pipe 122 may be completely eliminated, with the contact between the beveled surface 136 and seat surface 131 providing the installer with the tactile response or "feel" of a fully inserted hub.

Like the embodiment described above, the lip 133 shown in FIG. 6 may also be provided with a stop 139 that includes a stop surface that obstructs excessive penetration of the leading edge 137 of the hub as explained above in connection with the embodiment of FIG. 5.

In any of the embodiments described above, the stop 39, 139 may be shaped to include a bead 143 of elastomeric or other material that is attached to the stop surface 39, 139 to extend toward the outer end of the sleeve (that is, upwardly in FIG. 6) so that there is formed on the lip 33, 133 between the bead 143 and the seat surface 31,131 a void or pocket 145 that is sized to receive the leading edge of the hub and thus provide enhanced obstruction of or resistance to the penetration of the hub edge, while also increasing for the installer the feel of the proper seating of the hub into the sleeve. One of ordinary skill in the art will appreciate that the elements indicated by reference numerals 134, 138, 140, 142, 149, and 150 correspond to their counterparts 34, 38, 40, 42, 49, and 50, as described elsewhere in this specification and depicted in the drawings.

While the foregoing description was made in the context of a preferred embodiment, it is contemplated that modifications to that embodiment may be made without departure from the invention as claimed. For example, the portion of the sleeve seat surface 31 that is compressed by the beveled surface of the hub may be configured as one or more annular protrusions in the shape of semi-O rings. As respects the hub, the shoulder 40 may be a separate piece that is fastened to the separately manufactured hub. Also, the shoulder need not be a continuous member but could instead be made up of a few discrete projecting portions extending along the same sinusoidal path defined by the continuous version of the shoulder. It is also contemplated that, although a Tee-type connection is illustrated in the foregoing description, the components of the present assembly may also be adapted to work with Wye-type connections as mentioned above.

The invention claimed is:

1. A pipe connection assembly, comprising:
   a cylindrical hub having an interior diameter and a leading end having an exterior beveled surface that defines a leading edge of the hub;
   a cylindrical elastomeric sleeve having an inner end that includes a radially inwardly projecting lip that has a seat surface inclined to correspond to the beveled surface of the hub so that the seat surface engages the beveled surface of the hub when the leading end of the hub is inserted into the sleeve; and wherein
   the lip includes an annular stop projecting radially or axially inwardly and having an interior diameter that is less than the interior diameter of the hub, thereby to define a stop surface that contacts and obstructs the penetration of the leading edge of the hub beyond the stop surface when the hub is inserted into the sleeve.

2. The assembly of claim 1, wherein the lip is shaped to define a pocket in the stop surface to receive the leading edge of the hub.

3. The assembly of claim 1 wherein at least a portion of the seat surface normally extends from the sleeve by an amount sufficient to compress that portion as the seat surface engages the beveled surface of the hub when the hub is inserted into the sleeve.

4. The assembly of claim 3 wherein the sleeve fits into a hole in a pipe that has an interior surface, the sleeve further comprising a radially outwardly extending rib formed thereon and arranged to abut the interior surface of the pipe when the sleeve is fit into the hole, thereby to restrict rotation of the lip out of the path of the hub as the hub is inserted into the sleeve and thereby facilitate the compression of the portion of the seat surface.

5. The assembly of claim 1 wherein the sleeve fits into a hole in a pipe that has a thickness and an exterior surface, the sleeve further comprising a radially outwardly extending rib formed thereon and arranged to abut the exterior surface of the pipe when the sleeve is fit into the hole, and wherein the lip is spaced from the rib by an amount less than or substantially equal to the pipe thickness thereby to cause the seat surface to be compressed between the beveled surface and the pipe when the leading end of the hub is inserted into the sleeve.

6. The assembly of claim 1 further comprising annular protrusions formed on an inside surface of the sleeve to be compressed between the sleeve and the hub when the hub is inserted into the sleeve.

7. The assembly of claim 6 wherein the annular protrusions are configured to be compressed between the sleeve and a part of the hub that is spaced away from the beveled surface.

8. The assembly of claim 6 wherein the sleeve fits into a hole in a pipe and further comprises annular protrusions formed on an exterior surface of the sleeve to be compressed between the sleeve and a pipe into which the sleeve is fit when the leading end of the hub is inserted into the sleeve.

* * * * *